United States Patent [19]

Schmid

[11] Patent Number: 4,506,770

[45] Date of Patent: Mar. 26, 1985

[54] AUTOMATIC MOTOR AND CLUTCH CONTROLS

[75] Inventor: Christoph Schmid, Bühl, Fed. Rep. of Germany

[73] Assignee: Luk Lamellen und Kupplungsbau GmbH, Bühl, Fed. Rep. of Germany

[21] Appl. No.: 376,622

[22] Filed: May 10, 1982

[30] Foreign Application Priority Data

May 12, 1981 [DE] Fed. Rep. of Germany ....... 3118853

[51] Int. Cl.³ .............................................. B60K 41/28
[52] U.S. Cl. ................................ 192/0.08; 192/0.092; 123/339
[58] Field of Search ................... 192/0.08, 0.092, 0.03, 192/3.59, 3.58, 3.57, 0.048, 3.56, 3.55; 74/873, 874, 872; 123/399, 400, 401, 395, 339

[56] References Cited

U.S. PATENT DOCUMENTS

| | | | |
|---|---|---|---|
| 2,732,048 | 1/1956 | Forster et al. | 192/0.08 |
| 2,739,678 | 3/1956 | Parker | 192/0.08 |
| 3,129,795 | 4/1964 | Goeschel et al. | 192/0.08 X |
| 3,323,621 | 6/1967 | Peras | 192/0.08 |
| 3,455,260 | 7/1969 | Mennesson | 123/339 X |
| 4,105,002 | 8/1978 | Thoma | 123/339 |
| 4,248,333 | 2/1981 | Matsumoto et al. | 192/3.59 X |
| 4,321,900 | 3/1982 | Takeda | 123/339 |
| 4,377,994 | 3/1983 | Lang | 123/339 |

Primary Examiner—George H. Krizmanich
Attorney, Agent, or Firm—Peter K. Kontler

[57] ABSTRACT

The clutch between the crankshaft of the engine and the input shaft of the change-speed transmission in an automotive vehicle is disengaged in automatic response to start of actuation and during actuation of the gear-shift. An adjusting unit which is activated in response to manipulation of the gear-shift automatically changes the rate of fuel delivery to the engine, irrespective of the position of the gas pedal, so that the engine receives fuel at a rate matching or approximating that when the engine is idling during the interval which elapses while the operator selects a different transmission speed ratio.

17 Claims, 4 Drawing Figures

AUTOMATIC MOTOR AND CLUTCH CONTROLS

BACKGROUND OF THE INVENTION

The present invention relates to automotive vehicles in general, and more particularly to improvements in automotive vehicles of the type wherein the clutch between a rotary part (e.g., the crankshaft) of the engine and a rotary part, (e.g., the input shaft) of the change-speed transmission is automatically disengaged to interrupt the power flow between the two rotary parts in response to actuation of the gear-shift, and wherein the clutch is automatically reengaged in response to termination of actuation of the gear-shift.

It is already known to automatically disengage the clutch of an automotive vehicle in response to actuation of the gear-shift, e.g., in response to establishment of bodily contact between the gear-shift lever and the driver of the vehicle, and to automatically reengage the clutch as soon as the actuation of the gear-shift is completed, i.e., as soon as the operator of the vehicle has selected a different speed ratio and his or her hand releases the gear-shift lever. Vehicles which embody the just discussed feature exhibit several important advantages in comparison with conventional vehicles wherein the operator must depress a clutch pedal prior to shifting into a different gear. Thus, the provision of an automatic (automatically engageable and disengageable) clutch simplifies the operation of the vehicle because the clutch pedal and its manipulation can be dispensed with. A vehicle which embodies an automatic clutch also exhibits several important advantages over vehicles with automatic transmissions, i.e., the utilization of an automatic or automated clutch eliminates transmission losses which arise during transmission of power by way of a hydrodynamic transducer of the type normally required in vehicles employing automatic transmissions.

However, presently known vehicles which employ automatic clutches also exhibit certain drawbacks, especially as regards the regulation of fuel admission during shifting from a first into a different second speed ratio. Thus, the operator of the vehicle must actuate the gas pedal in order to regulate the admission of fuel preparatory to and during actuation of the gear-shift. This is necessary in order to achieve a certain correspondence or optimum relationship between the RPM of the engine and the RPM of the input shaft of the change-speed transmission; such relationship determines the degree of smoothness with which the gear-ratio changing operation is carried out. If the RPM of the engine is not properly synchronized with the RPM of the input shaft of the change-speed transmission, excessive acceleration of the engine at the time of disengagement of the clutch (i.e., excessive depression of the gas pedal at the instant of beginning to actuate the gear-shift), is likely to raise the RPM of the engine to such an extent that the engine overspeeds as soon as the crankshaft is disconnected from the input shaft of the transmission. Inversely, if the gas pedal is released prematurely, the engine is likely to stall or the output shaft of the transmission is likely to undergo excessive and abrupt deceleration with resulting discomfort to the occupant or occupants of the vehicle.

OBJECTS AND SUMMARY OF THE INVENTION

An object of the invention is to provide an automotive vehicle with novel and improved means for regulating the supply of fuel to the engine during shifting into a different gear.

Another object of the invention is to provide an automotive vehicle wherein the clutch is automatically disengaged preparatory to shifting into a different gear and wherein the rate of fuel admission to the engine is respectively reduced and increased automatically in response to or simultaneously with disengagement and reengagement of the clutch.

A further object of the invention is to provide novel and improved means for adjusting the rate of fuel supply to the engine of an automotive vehicle wherein the clutch between the engine and the transmission is automatically disengaged in response to start of the operation which involves shifting the transmission into a different speed ratio.

An additional object of the invention is to provide an arrangement which ensures that the shifting into a different gear with a transmission which receives torque by way of an automatic clutch is effected with a minimum of discomfort to the occupant or occupants of the automotive vehicle.

A further object of the invention is to provide a fuel saving arrangement for use in automotive vehicles wherein the engine transmits torque to the transmission by way of an automatic clutch.

Another object of the invention is to provide an arrangement of the above outlined character which does not interfere with normal regulation of fuel admission to the engine by way of a gas pedal or the like.

An additional object of the invention is to provide an arrangement of the above outlined character which simplifies the manipulation of the vehicle during shifting of the transmission into a different speed ratio and at the same time ensures that the operation of the vehicle is more economical than heretofore.

Still another object of the invention is to provide an arrangement of the above outlined character which contributes to longer useful life of the automatic clutch.

Another object of the invention is to provide an arrangement of the above outlined character which contributes to longer useful and disturbance-free life of the engine and/or transmission in an automotive vehicle.

Still another object of the invention is to provide a novel and improved method of controlling the operation of the engine during shifting of the transmission into a different speed ratio.

A further object of the invention is to provide a method of shifting gears in an automotive vehicle in such a way that the shifting results in a reduction of fuel consumption and contributes to longer useful life of the engine.

Another object of the invention is to provide a novel and improved method of preventing flooding and/or overspeeding of the engine in an automotive vehicle wherein the engine can transmit torque to a change-speed transmission by way of an automatic clutch.

A further object of the invention is to provide an automotive vehicle with plural controls for the delivery of fuel to the internal combustion engine.

Another object of the invention is to provide a vehicle of the just outlined character wherein the regulation of admission of fuel by way of one of the controls is not affected by the other controls, and vice versa.

An additional object of the invention is to provide novel and improved means for changing the position of the throttle valve and/or the setting of the fuel injecting means in an automotive vehicle wherein the engine can transmit torque by way of an automatic clutch.

Another object of the invention is to provide novel and improved means for overriding or bypassing the gas pedal during shifting of the change-speed transmission into a different gear.

One feature of the invention resides in the provision of a novel and improved combination of elements which are installed in an automotive vehicle of the type having an engine (e.g., an internal combustion engine), a change-speed transmission and an automatic clutch which is interposed between the engine and the transmission (e.g., between the crankshaft of an internal combustion engine and the input shaft of the transmission). In addition to the clutch, the improved combination comprises a gear-shift (e.g., a lever with a knob which can be engaged by the hand of the operator of the vehicle) actuatable to change the ratio of the transmission, regulating means for disengaging the clutch in response to actuation of the gear-shift so that the engine is disconnected from the transmission while the gear-shift is actuated and for reengaging the clutch when the actuation of the gear-shift is terminated, adjustable means (e.g., an adjustable throttle valve or an adjustable fuel injection pump) for supplying fuel to the engine, and means for adjusting the fuel supplying means so as to reduce the rate of fuel admission to the engine in response to and during actuation of the gear-shift. For example, the regulating means may be of the type which is operative to disengage the clutch in response to contacting of the gear-shift (e.g., in response to contacting of the aforementioned knob on the lever of the gear shift) by the operator of the vehicle. The adjusting means is preferably operative to reduce the rate of fuel admission to the engine in response to and during actuation of the gear-shift so as to match or approximate the rate of fuel admission during idling.

The vehicle further comprises second adjusting means for the fuel supplying means, and such second adjusting means comprises a member (e.g., the customary gas pedal) which is movable between a plurality of positions. The improved combination then further comprises or can further comprise means (e.g., an electric switch or the like) for establishing an operative connection between the gear-shift and the first mentioned adjusting means (hereinafter simply called first adjusting means) only within a certain range of the aforementioned plurality of positions of the member of the second adjusting means, e.g., after the gas pedal is depressed to a predetermined extent.

The second adjusting means can further comprise a power train (e.g., a bowden connection or a linkage) which connects the gas pedal with the fuel supplying means so that the rate of fuel admission to the engine is changed in response to movement (depression or release) of the gas pedal. The first adjusting means can be installed in or combined with the power train in such a way that it can adjust the rate of fuel admission to the engine independently of the gas pedal on actuation or termination of actuation, of the gear-shift. Thus, the power train can adjust (preferably pivot or turn) the valve or the fuel injection pump in response to depression of the gas pedal as well as in response to actuation of the gear-shift. In other words, the valve or the pump is adjusted with reference to the second adjusting means (including, for example, the gas pedal) when or while the gear-shift is actuated or when the actuation of the gear-shift is terminated. The aforementioned power train between the gas pedal and the pump or valve can comprise a linkage of variable effective length so that the length of the linkage changes automatically in response to adjustment of the pump or valve by the first adjusting means. For example, the linkage can comprise a first flexible or substantially rigid component, a second flexible or substantially rigid component, and a device (e.g., a spring) for moving one of the components relative to the other component and to thereby change the effective length of the linkage.

Alternatively, the first adjusting means can comprise means for terminating or interrupting the connection between the link train and the pump or valve in response to actuation of the gear-shift; the pump or valve is then adjusted by the first adjusting means while the connection between the link train (i.e., between the gas pedal) and the pump or valve is interrupted. The connection-terminating or interrupting means can comprise a resilient element which is interposed between the link train and the pump or valve.

The connection between the gas pedal and the pump or valve can include the aforementioned bowden connection having a tubular element and a flexible second element extending through the tubular element. Each of the two elements is movable to thereby adjust the pump or valve. In accordance with a feature of the embodiment which includes the bowden connection, one element of the bowden connection is movable by the first adjusting means, and the other element of the bowden connection is movable by the second adjusting means. The first adjusting means can comprise means for moving the tubular element of the bowden connection relative to the second element, and such moving means can comprise an electromagnet or another suitable motion generating device which can shift the tubular element of the bowden connection lengthwise. The electromagnet can be fixedly mounted on a portion of the housing (e.g., chassis) of the automotive vehicle. The just mentioned embodiment of the invention preferably further comprises a fixed abutment and resilient means (e.g., a coil spring) interposed between the abutment and the tubular element of the bowden connection to yieldably oppose the movement of the tubular element under the action of the motion generating device. A second coil spring or the like can be utilized to yieldably bias the fuel supplying means to a position in which the rate of fuel admission to the engine matches or approximates that when the engine is idling, and the bias of the first spring preferably exceeds and opposes the bias of the second spring.

The first adjusting means can comprise a first member (e.g., a lever) which is rigid with the shaft for the valve of the fuel supplying means, and the second adjusting means can comprise a second lever or another suitable member which is turnable about the axis of the valve shaft and is coupled to the first member by a torsion spring or the like. The arrangement is such that the second member can adjust the valve through the medium of the first member when the gas pedal of the second adjusting means is moved or permitted to move, and that the first lever adjusts the valve in response to actuation of the gear-shift (at such time, the first lever moves relative to the second lever). The first adjusting means preferably further comprises a motion generating device which is started in response to actuation of the gear-shift to move the first member relative to the second member. The functions of the first and second members can be reversed, i.e., the member which is pivotable in response to movement of the gas pedal can be rigidly connected to the valve shaft.

In lieu of the aforementioned rotary throttle valve, the fuel supplying means can comprise the aforementioned pump or an analogous adjustable fuel injecting device, i.e., the first adjusting means is then operative to adjust the fuel injecting device (e.g., by way of an electromagnet) so that the fuel injecting device admits fuel in response to and during actuation of the gear-shift at a rate corresponding at least substantially to the rate at which the engine is idling.

The novel features which are considered as characteristic of the invention are set forth in particular in the appended claims. The improved combination itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
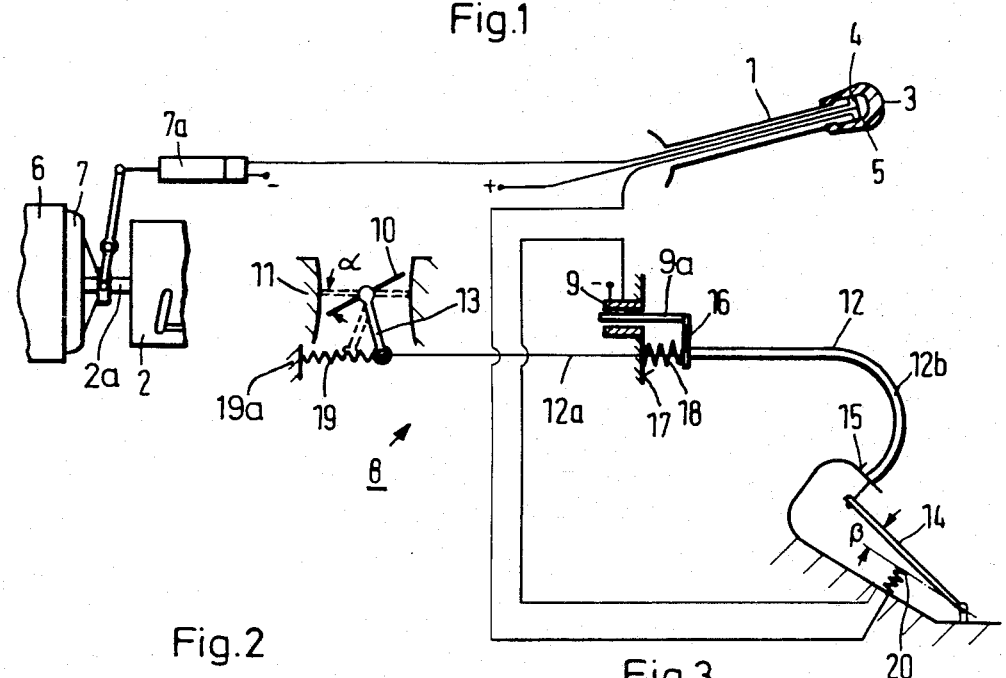
FIG. 1 is a fragmentary schematic elevational view of an engine, of a change-speed transmission and of a novel combination which is constructed and assembled in accordance with a first embodiment of the invention and wherein an angularly movable throttle valve of the fuel supplying means is adjustable by one of two adjusting units to reduce the rate of fuel admission to the engine when the gear-shift for the transmission is actuated.

Referring first to FIG. 1, there is shown a portion of an automotive vehicle which comprises an internal combustion engine 6 whose crankshaft (not specifically shown) can be connected to the input shaft 2a of a change-speed transmission 2 by an automatic clutch 7 of known design, e.g., a clutch manufactured and sold by the assignee of the present application. The arrangement is such that the clutch 7 is normally engaged but is automatically disengaged in response to actuation of a gear-shift 1 (e.g., a customary lever having a knob 3 which can be engaged by hand to change the speed ratio of the transmission 2 in a manner not forming part of the present invention). The knob 3 of the gear-shift 1 confines two electric switches 4 and 5 which are normally open but close on engagement of the knob, e.g., as a result of mere contact between the hand of the operator and the knob 3. Closing of the switch 4 on actuation of the gear-shift 1 (i.e., in response to initiation of and during actual procedure which involves changing the speed ratio of the transmission 2) entails automatic disengagement of the clutch 7 through the medium of a regulating means here shown as an electrical or electronic servo component 7a of commercially available design, i.e., the engine 6 is automatically disconnected from and cannot transmit torque to the input shaft 2a in response to actuation of the gear-shift 1 as well as while the gear shift is being actuated to change the speed ratio of the transmission 2. The operative connection between the gear-shift 1 and the clutch 7 can include other components which are not specifically shown in FIG. 1; all that counts is to ensure that the clutch 7 is disengaged when the operator begins to actuate the gear-shift 1 and that the clutch 7 remains disengaged during the interval of actuation of the gear-shift for the purpose of changing the speed ratio of the transmission 2.

Closing of the second switch 5 in the knob 3 causes a first adjusting unit 8 to change the angular position of a fuel supplying valve 10, e.g., a customary throttle valve in the carburetor 11 of the vehicle, so that the valve 10 reduces the rate of fuel delivery to the engine 6, preferably to a valve which is required to operate the engine at idling speed. The reduced speed of the engine 6 may but need not exactly match the idling speed. The first adjusting unit 8 comprises a motion generating device 9 here shown as an electromagnet which is mounted on a fixed retainer 17 forming part of the housing or chassis of the vehicle and having a reciprocable armature 9a for an abutment 16. When the switch 5 is closed in response to engagement of the knob 3, the electromagnet 9 is energized and its armature 9a is moved in a direction to change the angular position of the valve 10 in a sense to reduce the rate of fuel delivery to the engine 6. The armature 9a adjusts the valve 10 through the medium of the inner element or flexible core 12a of a power train constituting a bowden connection 12 which further includes a flexible tubular element or sheath 12b for a portion of the core 12a.

The left-hand end portion of the core 12a is attached to a lever 13 which is rigid with the valve 10, and the righthand end portion of the core 12a is connected to a pivotable gas pedal 14 constituting or forming part of a second adjusting unit for the valve 10. One end face of the tubular element 12b of the bowden connection 12 engages the abutment 16 on the armature 9a of the electromagnet 9, and the other end face of the tubular element 12b bears against a fixed stop 15 forming part of or secured to the aforementioned chassis or housing of the vehicle. A resilient element in the form of a coil spring 18 is installed between the stationary portion or retainer 17 of the housing and the mobile abutment 16 to urge the latter in a direction to the right, as viewed in FIG. 1, namely, counter to the direction of movement of the abutment 16 in response to energization of the electromagnet 9, i.e., in response to actuation of the gear-shift 1 and resulting closing of the switch 5. In other words, the spring 18 urges the tubular element 12b in a direction toward the stop 15, and this spring is caused to store energy when the electromagnet 9 is energized to move its armature 9a in a direction to the left, as viewed in FIG. 1. Energization of the electromagnet 9 thus entails a shortening of that portion of the core 12a which extends between the retainer 17 and the stop 15 so that the valve 10 (which is attached to the core 12a by the lever 13) can turn in a clockwise direction, as viewed in FIG. 1, through an angle alpha to assume the broken-line position. Such movement of the valve 10 (from the solid-line to the broken-line position of FIG. 1) is promoted by a biasing device 19 in the form of a second coil spring which reacts against a stationary retainer 19a and whose bias is less pronounced than that of the spring 18. The mounting of the springs 18 and 19 is such that the spring 19 tends to move the valve 10 from the broken-line position to the solid-line position of FIG. 1, i.e., the spring 18 opposes and can overcome the bias of the spring 19.

In certain instances (i.e., under certain circumstances), it may be desirable to reduce the rate of fuel delivery to the engine 6 only when the angular position of the gas pedal 14 is within a range of positions which is narrower than the full range of positions the gas pedal 14 can assume with reference to the housing or chassis of the vehicle. For example, the arrangement may be such that the first adjusting unit 8 can become effective only after the gas pedal 14 is depressed to a predetermined extent, e.g., through the angle beta shown in the lower right-hand portion of FIG. 1. The gas pedal 14 then closes a switch 20 which is connected in series with the switch 5, i.e., the electromagnet 9 can be energized only when the switch 5 is closed simultaneously with the switch 20.

An important advantage of the improved combination is that the operation which involves changing the speed ratio of the transmission 2 can be carried out with ease and without necessitating extra attention on the part of the operator of the vehicle. Thus, the operator need not concentrate on maintaining the gas pedal 14 in an optimum position because the rate of fuel delivery during shifting into a different gear is selected and maintained by the adjusting unit 8, and this unit ensures that the rate of fuel delivery during actuation of the gear-shift 1 is satisfactory in a number of respects, i.e., it is satisfactory because it prevents undue and abrupt deceleration of the vehicle such as would be uncomfortable to the occupant or occupants, it is satisfactory because it prevents flooding of the engine 6 after the gear shifting operation is completed, it is satisfactory because it prevents overspeeding of the engine 6 upon completion of or during shifting into a different gear, and it is satisfactory on the further ground that the vehicle saves energy because the rate of fuel delivery is reduced invariably whenever the operator is in the process of selecting a different transmission ratio. Overspeeding of the engine 6 could take place in response to delivery of excessive quantities of fuel during the interval which is required to change the speed ratio of the transmission, i.e., while the clutch 7 is disengaged because the switch 4 is closed.

Another important advantage of the improved combination is that the rate of fuel delivery is changed automatically when the gear shifting operation is completed, i.e., the gas pedal 14 takes over as the sole means for adjusting the position of the valve 10 as soon as the operator removes his or her hand from the knob 3 of the gear-shift 1. The rate of fuel delivery after completion of the gear shifting operation is the same as before provided, of course, that the operator did not change the angular position of the gas pedal 14 during the interval of contact between the operator's hand and the knob 3.

Since the RPM of the engine 6 is reduced in response to disengagement of the clutch 7 (i.e., in response to establishment of contact between the operator's hand and the knob 3), the ratio of RPM of the crankshaft of the engine 6 to RPM of the input shaft 2a of the transmission 2 is invariably relatively low when the clutch 7 is reengaged, i.e., when the operator releases the knob 3. In other words, the difference between the RPM of the engine and the RPM of the shaft 2a is lower than in the absence of the first adjusting unit 8. This contributes to the comfort of the occupant or occupants of the automotive vehicle and this also contributes to longer useful and disturbance-free life of the engine 6, clutch 7 and transmission 2. The useful life of the clutch 7 is prolonged because slippage of component parts of the clutch during shifting into a different gear is reduced or equals zero.

The provision of the switch 20 in series with the switch 5 exhibits the advantage that the first adjusting unit 8 need not be activated when such activation is not warranted by the angular position of the gas pedal 14, i.e., when the angular position of the gas pedal 14 itself ensures that the rate of fuel delivery to the engine 6 is relatively low, e.g., that such rate matches or approximates the rate of fuel delivery during idling.

Another advantage of the combination which is shown in FIG. 1 is that the connection between the gas pedal 14 and the valve 10 can constitute a simple bowden connection (12) which is preferred or used with advantage in many types of automotive vehicles. Thus, all that is necessary is to provide an adjusting unit (8) which is capable of adjusting the position of the valve 10 by way of the very connection (12) which is normally used to select the rate of fuel admission by changing the angular position of the gas pedal 14.

Figure 2:
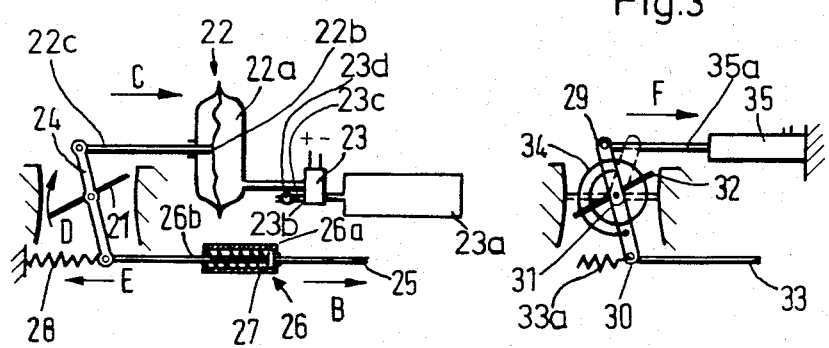
FIG. 2 illustrates a different embodiment of the two adjusting units for the valve.

FIG. 2 shows a portion of a modified combination wherein the engine 6, the clutch 7, the transmission 2, the regulating means 7a, the gear-shift 1 and the gas pedal 14 are omitted. The means for supplying fuel to the engine comprises a turnable throttle valve 21 which is connected with a two-armed lever 24 biased by a spring 28 in a direction to effect a reduction in the rate of fuel delivery to the engine. One arm of the lever 24 is connected with the gas pedal by a power train or linkage 25 of variable length, and the other arm of the lever 24 is connected with the gear-shift by a first adjusting unit including a valve 23 and a motion generating device 22. The valve 23 is actuatable in response to closing to a switch corresponding to the switch 5 of FIG. 1 to connect the right-hand chamber 22a of the device 22 with a suction generating device 23a of any known design, e.g., with the intake of a blower. The device 22 further comprises a piston 22b here shown as a deformable membrane which bounds one side of the chamber 22a and is connected with the upper arm of the lever 24 by a rod 22c. The arrangement is such that, when the valve 23 receives a signal on closing of the switch 5 or an equivalent component, the suction generating device 23a immediately evacuates air from the chamber 22a so that the central portion of the membrane 22b is flexed in a direction to the right, as viewed in FIG. 2, whereby the rod 22c moves in the direction of arrow C and pivots the lever 24 in a direction to turn the valve 21 clockwise (note the arrow D). When the switch 5 opens, the valve 23 seals the chamber 22a from the suction generating device 23a and connects this chamber with the atmosphere so that the rod 22c ceases to pull the lever 24 in a clockwise direction.

When the gas pedal is depressed, the linkage 25 pivots the lever 24 in a counterclockwise direction, as viewed in FIG. 2, so that the rate of fuel admission into the engine increases. Such angular movement of the lever 24 is opposed by the spring 28 which tends, to move the rigid left-hand member 26b of a length-changing device 26 for the linkage 25 in the direction of arrow E. The device 26 further comprises a second rigid member 26a which can be displaced by the gas pedal in the direction of arrow B and receives the right-hand portion of the member 26b. A coil spring 27 is interposed between the members 26a and 26b in such a way that it urges the member 26b deeper into the member 26a, i.e., this spring cooperates with the members 26a, 26b by tending to reduce the effective length of the linkage 25.

When the operator of the vehicle embodying the structure of FIG. 2 wishes to increase the rate of fuel admission into the engine, the operator depresses the gas pedal to move the entire linkage 25 in the direction of arrow B, i.e., to pivot the lever 24 and the valve 21 counterclockwise and to thereby stress the spring 28 which is weaker than the spring 27. In other words, the spring 27 does not yield but the spring 28 is caused to store energy when the gas pedal is depressed.

The effective length of the linkage 25 is increased by the motion generating device 22 in response to closing of the switch 5, i.e., in response to actuation of the valve 23 in such a way that the suction generating device 23a is free to evacuate air from the chamber 22a. The rod 22c is then moved in the direction of arrow C and the lever 24 moves the valve 21 clockwise to a position in which the rate of fuel admission to the engine preferably matches or approximates the rate of fuel admission during idling. Clockwise pivoting of the lever 24 automatically entails a lengthening of the linkage 25 because the lever 24 is pivoted clockwise against the opposition of the spring 27 which yields to allow the member 26b to move in the direction of the arrow E, i.e., the length of that portion of the member 26b which extends into the member 26a of the device 26 for changing the effective length of the linkage 25 is reduced. The member 26a can constitute a cylinder and the member 26b can constitute a piston rod which carries a piston. The spring 27 bears against the piston and reacts against the left-hand end wall of the cylinder 26a.

The spring 28 ensures that the valve 21 automatically assumes a position for idling of the engine when the gas pedal is not depressed, i.e., when the gas pedal does not oppose a movement of the entire device 26 in a direction to the left, as viewed in FIG. 2. It will be noted that the spring 28 stores energy when the spring 27 is free to expand, i.e., when the effective length of the linkage 25 is reduced. As mentioned above, the bias of the spring 28 is weaker than that of the spring 27.

The operation of the arrangement which is shown in FIG. 2 will be readily understood upon perusal of the preceding description. Thus, when the operator contacts the knob of the gear-shift to close the switch 5, the valve 23 connects the suction generating device 23a with the chamber 22a of the motion generating device 22 whereby the central portion of the membrane 22b moves the rod 22c in the direction of arrow C, the lever 24 is pivoted in a clockwise direction (arrow D), and the valve 21 is moved to a position in which the rate of fuel admission to the engine matches or approximates that rate at which the engine is idling. The lever 24 pulls the member 26b in the direction of arrow E (and such movement of the member 26b is assisted by the spring 28 but is opposed by the spring 27) with the result that the effective length of the linkage 25 is increased (it is assumed here that the position of the member 26a does not change in response to movement of the member 26b on pivoting of the lever 24 in a clockwise direction). The operator of the vehicle is assumed to urge the member 26a in the direction of arrow B by maintaining his or her foot on the gas pedal.

When the switch 5 is caused or allowed to open, i.e., when the gear shifting operation is completed, the valve 23 connects the chamber 22a with the atmosphere and the rod 22c ceases to pull the upper arm of the lever 24 in the direction of arrow C. This enables the spring 27 to contract against the opposition of the weaker spring 28 so that the effective length of the linkage 25 is again indicative exclusively of the angular position of the gas pedal, i.e., the valve 21 is compelled to reassume that angular position which corresponds to the momentary angular position of the gas pedal. If the angular position of the gas pedal remains unchanged while the operator actuates the gear-shift, the valve 21 reassumes that angular position which was dictated by the angular position of the gas pedal prior to actuation of the gear-shift.

The port 23b of the valve is connected with the atmosphere by a conduit 23c containing a flow restrictor 23d. This flow restrictor constitutes a time delay device which prevents abrupt return of the valve 21 to a position deviating from the position for idling of the engine. Thus, the flow restrictor 23d prevents flooding of the engine; such flooding could take place if the valve 21 were permitted to abruptly change its angular position to such an extent that the rate of fuel delivery to the engine would increase at a higher than permissible pace. The damping operation of the flow restrictor 23d has been found to be highly beneficial to the engine, i.e., the useful life of the engine is prolonged and the engine requires less frequent inspection and/or repair.

The device 26 which is shown in FIG. 2 constitutes but one of numerous devices which can be used to change the effective length of the linkage 25 in automatic response to actuation and termination of actuation of the gear-shift. For example, the illustrated device 26 can be replaced with a suitable fluid-operated cylinder and piston unit or with a device resembling a turnbuckle of the type wherein the rotary part is automatically driven to lengthen the linkage in response to initial actuation of the gear-shift and to shorten the linkage when the actuation of the gear-shift is terminated.

The device 22 can be replaced with an electromagnet, with a fluid-operated cylinder and piston unit, or with another suitable motion generating system without departing from the spirit of the invention.

Figure 3:
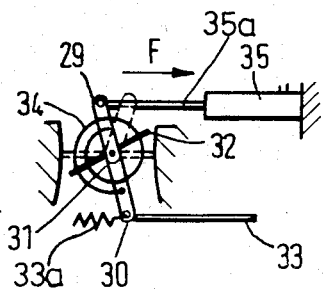
FIG. 3 shows a third embodiment of the two adjusting units for the valve.

FIG. 3 illustrates a portion of a third combination wherein the valve 32 is turnable about an axis which is defined by a shaft 31. The first adjusting unit includes a motion generating device 35 which is energized or otherwise started in response to closing of a switch corresponding to the switch 5 of FIG. 1 to move the rod 35a in the direction of arrow F. The rod 35a is coupled to a first motion transmitting member 29 which is a lever rigid with the shaft 31 and adapted to turn the valve 29 in a clockwise direction, as viewed in FIG. 3, in response to activation of the device 35, i.e., in response to actuation of the gear-shift which is not specifically shown in FIG. 3. The second adjusting unit includes the gas pedal (not shown in FIG. 3) and a power train or linkage 33 which connects the gas pedal with a second motion transmitting member 30 in the form of a lever which is pivotable about the axis of and relative to the shaft 31. A torsion spring 34 couples the members 29 and 30, and a coil spring 33a is provided to yieldably urge the valve 32 to a position in which the rate of fuel delivery to the engine (not shown) is reduced, for example, to approximate or to match the rate of fuel delivery during idling. The purpose of the spring 34 is to normally maintain the member 30 in a predetermined angular position with reference to the member 29. The motion generating device 35 can constitute an electromagnet having an armature which includes or constitutes the rod 35a.

It is assumed that the gas pedal which is coupled to the linkage 33 is partially depressed. When the operator of the vehicle contacts the knob of the gear-shift (not shown in FIG. 3), the motion generating device 35 is activated and pulls the rod 35a in the direction of arrow F to thereby cooperate with the spring 33a and turn the valve shaft 31 with the valve 32 in a clockwise direction, as viewed in FIG. 3, namely, in a direction to reduce the rate of fuel admission to the engine. The depressed gas pedal maintains the member 30 in the illustrated angular position, i.e., the torsion spring 34 stores energy because the member 29 turns relative to the member 30. The new position of the valve 32 (in which the engine is assumed to receive fuel at the rate matching or approximating the rate of fuel admission during idling) is indicated in FIG. 3 by broken lines.

When the operator has completed the gear-shifting operation, the motion generating device 35 is deactivated and the torsion spring 34 is free to return the member 29 to the angular position which is shown in FIG. 3 by solid lines. At such time, the member 29 turns counterclockwise relative to the member 30, the spring 34 dissipates energy, and the spring 33a stores energy. The bias of the spring 34 exceeds the bias of the spring 33a. The operator can change the rate of fuel admission to the engine by the gas pedal without any interference on the part of the first adjusting unit (including the parts 35, 35a and 29) as soon as the gear shifting operation is completed. The same holds true for the embodiments of FIGS. 1 and 2.

A difference between the constructions which are shown in FIGS. 2 and 3 is that the length of the linkage 33 of FIG. 3 need not be changed when the gear-shift is actuated or when the actuation of the gear-shift is terminated. Instead, the structure of FIG. 3 disconnects the linkage 33 from the valve 32 during the interval which is required to change the speed ratio of the change-speed transmission.

An advantage of the structure which is shown in FIG. 3 is that it is extremely simple, compact, inexpensive and highly reliable. Thus, all that is necessary is to couple the member 30 with the gas pedal, to operatively connect the member 29 with the gear-shift, and to provide between the members 29 and 30 a connection (torsion spring 34) whose bias exceeds that of the spring 33a and which ensures that the valve 32 can receive motion from the linkage 33 whenever the motion generating device 35 is idle, i.e., at all times except when the operator is in the process of changing the speed ratio of the transmission.

Figure 4:
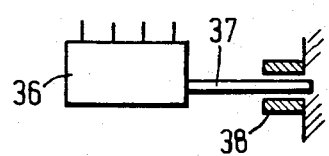
FIG. 4 illustrates a modification according to which the fuel supplying means includes an adjustable fuel injection pump and the one adjusting unit comprises an electromagnet whose armature can adjust the pump.

Referring finally to FIG. 4, there is shown a portion of a further combination wherein the fuel supplying means comprises a commercially available adjustable fuel injection pump 36 having a rod 37 which can be shifted axially to thereby change the rate of fuel delivery to the engine, not shown. The first adjusting unit includes a motion generating device 38 (e.g., an electromagnet whose armature may include or constitute the rod 37) which is energized in response to closing of a switch corresponding to the switch 5 of FIG. 1 to thereby move the rod 37 to a position in which the pump 37 supplies fuel at a rate matching or corresponding to that during idling of the engine. The manner in which the second adjusting unit (preferably including a gas pedal) can adjust the pump 36 when the motion generating device 38 is inactive is the same as in conventional vehicles wherein the engine receives fuel by way of an injection pump.

An advantage of the combination which includes the structure of FIG. 4 is that there is no need to provide more or less complex connections between the first and second adjusting units for the fuel supplying means. All that is necessary is to ensure that, if the rod 37 is not directly acted upon by the gas pedal, this rod can move in response to activation of the motion generating device 38 even if the gas pedal is depressed, i.e., that the motion generating device 38 can override the gas pedal by selecting a predetermined rate of fuel delivery irrespective of the angular position of the gas pedal at the time when the gear-shift is actuated.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. In an automotive vehicle having an engine and a change-speed transmission, the combination of a gear-shift which is actuatable to change the ratio of the transmission; a clutch interposed between the engine and the transmission; regulating means for disengaging said clutch in response to actuation of said gear-shift so that the engine is disconnected from the transmission while the gear-shift is actuated and for reengaging said clutch when the actuation of the gear-shift is terminated; adjustable means for supplying fuel to the engine; first adjusting means for adjusting said supplying means so as to reduce the rate of fuel admission to the engine in response to and during actuation of said gear-shift; second adjusting means for said fuel supplying means, said second adjusting means comprising a member which is movable between a plurality of positions; and means for establishing an operative connection between said gear-shift and said first adjusting means only within a certain range of said plurality of positions of said member.

2. The combination of claim 1, wherein said regulating means is operative to disengage said clutch in response to contacting of said gear-shift by the operator of the vehicle.

3. The combination of claim 1, wherein said first adjusting means is operative to reduce the rate of fuel admission in response to and during actuation of said gear-shift to a rate at least approximating that at which the engine is idling.

4. The combination of claim 1, wherein said member of said second adjusting means includes a depressible gas pedal which must be depressed to a predetermined extent before its position is within said range.

5. The combination of claim 1, wherein said member is a mobile gas pedal and said second adjusting means further comprises a power train connecting said pedal with said fuel supplying means so that the rate of fuel admission to the engine is changed in response to movement of said pedal, said first adjusting means being installed in said power train and being operative to adjust the rate of fuel admission to the engine independently of the pedal on actuation of said gear-shift.

6. The combination of claim 1, wherein said fuel supplying means comprises a pivotable throttle valve.

7. In an automotive vehicle having an engine and a change-speed transmission, the combination of a gear-shift which is actuatable to change the ratio of the transmission; a clutch interposed between the engine and the transmission; regulating means for disengaging said clutch in response to actuation of said gear-shift so that the engine is disconnected from the transmission while the gear-shift is actuated and for reengaging said clutch when the actuation of the gear-shift is terminated; adjustable means for supplying fuel to the engine, comprising an adjustable valve; first adjusting means for adjusting said supplying means so as to reduce the rate of fuel admission to the engine in response to and during actuation of said gear-shift; and second adjusting means for adjusting said valve in non-actuated condition of said gear-shift, said first adjusting means being operative to adjust said valve independently of said second adjusting means on actuation of said gear-shift so that said valve is then adjusted with reference to said second adjusting means.

8. The combination of claim 1, wherein said second adjusting means includes a linkage of variable effective length so that the length of said linkage changes automatically in response to adjustment of said valve by said first mentioned adjusting means.

9. The combination of claim 8, wherein said linkage includes a first substantially rigid component, a second substantially rigid component and means for moving one of said components relative to the other of said components to thereby change the effective length of the linkage.

10. In an automotive vehicle having an engine and a change-speed transmission, the combination of a gear-shift which is actuatable to change the ratio of the transmission; a clutch interposed between the engine and the transmission; regulating means for disengaging said clutch in response to actuation of said gear-shift so that the engine is disconnected from the transmission while the gear-shift is actuated and for reengaging said clutch when the actuation of the gear-shift is terminated; adjustable means for supplying fuel to the engine; first adjusting means for adjusting said supplying means so as to reduce the rate of fuel admission to the engine in response to and during actuation of said gear-shift; second adjusting means for said fuel supplying means; and a bowden connection interposed between said second adjusting means and said fuel supplying means, said connection including a tubular element and a flexible second element extending through said tubular element, each of said elements being movable to thereby adjust said fuel adjusting means, one of said elements being movable by said second adjusting means and the other of said elements being movable by said first adjusting means.

11. The combination of claim 10, wherein said first mentioned adjusting means includes means for moving said tubular element relative to said second element.

12. The combination of claim 11, wherein said second adjusting means comprises a depressible pedal.

13. The combination of claim 11, wherein said first mentioned adjusting means comprises a motion generating device which is arranged to effect a lengthwise movement of said tubular element.

14. The combination of claim 13, wherein said motion generating device includes an electromagnet and the vehicle further comprises a housing supporting said electromagnet.

15. The combination of claim 13, further comprising a fixed abutment and resilient means interposed between said abutment and said tubular element and arranged to yieldably oppose the movement of said tubular element under the action of said motion generating device.

16. The combination of claim 15, further comprising means for yieldably biasing said fuel supplying means to a position in which the rate of fuel admission to the engine matches or approximates that at which the engine is idling, the biasing of said resilient means upon said tubular element exceeding the bias of said bias means.

17. The combination of claim 16, wherein said resilient means comprises a first coil spring and said biasing means comprises a second coil spring.

* * * * *